United States Patent [19]
Shimada

[11] 3,765,515
[45] Oct. 16, 1973

[54] BRAKE DEVICE HAVING BRAKE CLEARANCE ADJUSTING MEANS
[75] Inventor: Karo Shimada, Ohta-ku, Tokyo, Japan
[73] Assignee: Tokyo Buhin Kogyo Co., Ltd., Kanagawa, Japan
[22] Filed: Aug. 4, 1972
[21] Appl. No.: 277,860

[30] Foreign Application Priority Data
Aug. 7, 1971 Japan.................................. 46/59833

[52] U.S. Cl... 188/79.5 GE, 188/70 R, 188/196 BA
[51] Int. Cl............................................. F16d 65/56
[58] Field of Search...................... 188/70 R, 79.5 P, 188/79.5 GE, 196 BA, 325, 330, 332

[56] References Cited
UNITED STATES PATENTS
3,545,578  12/1970  Belart........................... 188/196 BA
3,610,374  10/1971  Troyer........................... 188/79.5 GE Primary Examiner—Duane A. Reger
Attorney—Richard K. Stevens et al.

[57] ABSTRACT

A brake device having a brake drum and a pair of brake shoes, a screw rod having screw threads of opposite direction at its opposite ends, a pair of nuts axially slidably but non-rotatably supported on a stationary housing, said nuts engaging with the screw threads on the screw rod and adapted to move the brake shoes into frictional contact with the brake drum in response to the rotation of the screw rod, a brake clearance adjusting means provided between one of the nuts and the adjacent brake shoe.

9 Claims, 5 Drawing Figures

BRAKE DEVICE HAVING BRAKE CLEARANCE ADJUSTING MEANS

The present invention relates to a brake device and more particularly to such a brake device that has a floating screw rod having screw threads of the opposite directions at its opposite ends and a pair of nuts engaging with the screw threads and adapted to force corresponding brake shoes into frictional engagement with a brake drum.

An object of the present invention is to provide a brake device which has a novel brake clearance adjusting mechanism.

A further object of the present invention is to provide a brake device having a positive and durable brake clearance adjusting mechanism.

According to the present invention, there is provided a brake device comprising a brake drum, a pair of brake shoes having brake linings adapted to be brought into friction contact with the brake drum, a floating screw rod having screw threads of opposite directions at its opposite ends, means for rotating said screw rod, a pair of nuts supported axially movably on a stationary part and threadably engaging with the screw threads at the ends of the screw rod, said nuts being adapted to be axially moved in response to the rotation of the screw rod for pushing the brake shoes into friction contact with the brake drum, characterized by the fact that at least one of the nuts is connected through a brake clearance adjusting mechanism comprising a one way clutch means including a primary clutch element connected to the screw rod through a lost motion mechanism so that the element is rotated when the screw rod is rotated during brake application beyond a predetermined angular extend and a secondary clutch element which is rotated by the primary clutch element during returning movement of the latter after it is rotated by the screw rod, and means for moving one of the brake shoes with respect to the brake drum in response to the rotation of the secondary clutch element.

According to one aspect of the present invention said secondary clutch element is provided with an internal thread, a push being provided and having an external thread for engagement with the internal thread of the secondary clutch element, said push rod being connected with said one brake shoe and restricted against rotation, whereby a rotation of the secondary clutch element is transferred into an axial movement of the push rod for producing an adjusting movement of the brake shoe with respect to the brake drum.

According to another aspect of the present invention, said device further comprises means for disengaging the clutch elements during braking operation for the rotation of the brake drum in one direction so that the brake clearance adjusting mechanism is made inoperative for the rotation of the brake drum in said direction. In this arrangement, the brake clearance adjusting mechanism operates only for the rotation of the brake drum in the other direction.

The arrangements of the present invention are advantageous in that the adjusting movements are produced during brake releasing movement so that positive adjustment can be performed. Further, the one-way clutch mechanism is durable as compared with a conventional pawl-ratchet wheel mechanism since all of the teeth on the clutch elements simultaneously works. The arrangement of the present invention is applicable to any types of brake systems including a leading shoe type, a trailing shoe type, two leading shoe type and duo-servo type.

These and other objects and features of the present invention will become apparent from the description of preferred embodiments taking reference to the accompanying drawings, in which.

Figure 1:
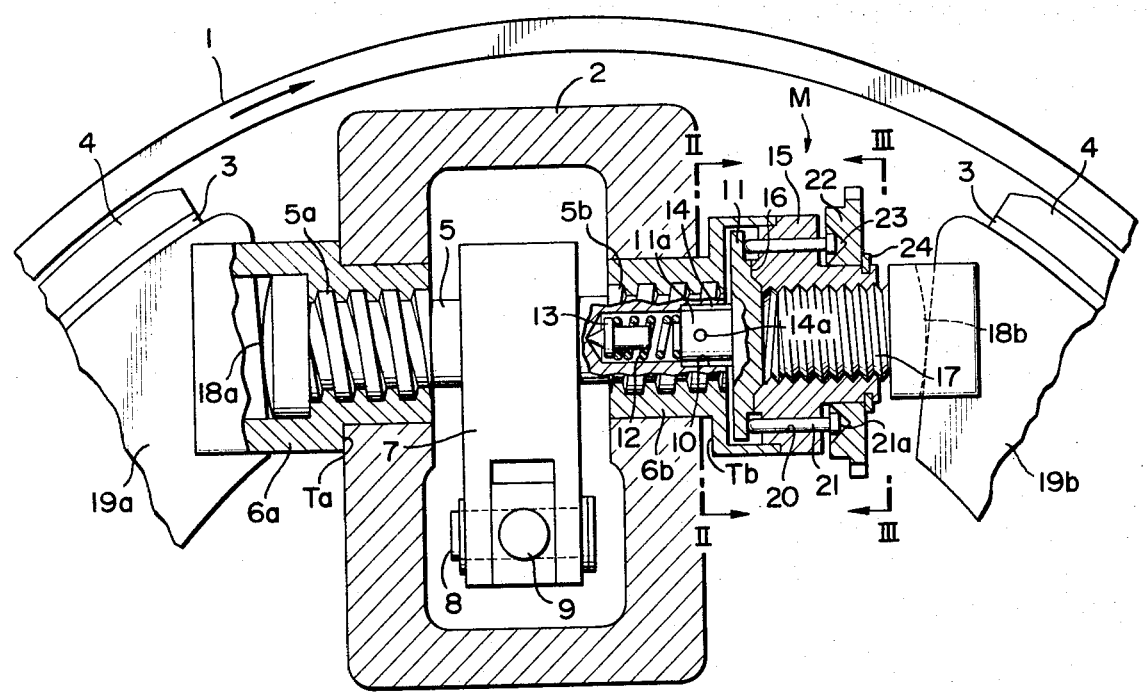
FIG. 1 is a partially sectioned fragmentary front view of a brake device embodying the present invention.

Referring to the drawings, particularly to FIG. 1, there is shown a brake drum 1 which may be a conventional construction and is rotated with a heel wheel an automobile. Within the brake drum 1, there disposed a hollow screw housing 2 which is secured to a body or frame of the automobile. Along the inner surface of the brake drum 1, there is disposed a pair of brake shoes 3 which are located one on each side of the screw housing 2. Each of the brake shoe 3 has a brake lining 4 facing to the inner surface of the brake drum 1 and adapted to the forced into contact therewith when brake is applied. Further, each of the brake shoe 3 is provided with a frame 19a or 19b which may be pivoted at the side not shown in FIG. 1 on the body of the automobile.

The screw housing 2 is formed with a pair of aligned holes in which nuts 6a and 6b are respectively received in an axially slidable manner. The nuts 6a and 6b are provided with shoulder portions Ta and Tb, respectively, which are adapted to abut the outer wall surface of the screw housing 2. Within the hollow interior of the screw housing 2, there is disposed a screw rod 5 which has screw threads 5a and 5b of opposite directions at its opposite ends. The nuts 6a and 6b have internal threads which engage with the screw threads 5a and 5b, respectively. The screw rod 5 has a transverse arm 7 secured thereto at its one end, and a link member 9 is articulated to the opposite end of the arm 7 through a pin 8. The link member 9 is axially moved by a suitable power source such as a hydraulic or air cylinder, not shown, to produce a swinging movement of the arm 7. Thus, the screw rod 5 can be rotated about its own axis in response to the axial movement of the link member 9. The nut 6a has a bifurcated outer end which engages the upper end of the frame 19a of the brake shoe 3. As shown in FIG. 1, the bottom of the bifurcated end of the nut 6a is provided with a convex seat 18a which is adapted to contact with the adjacent edge of the frame 19a.

Figure 2:
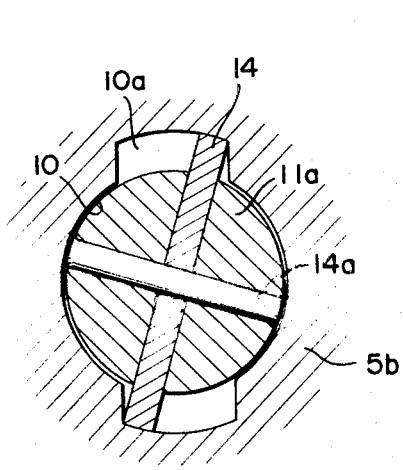
FIG. 2 is a sectional view taken along the line II—II in FIG. 1.
Figure 3:
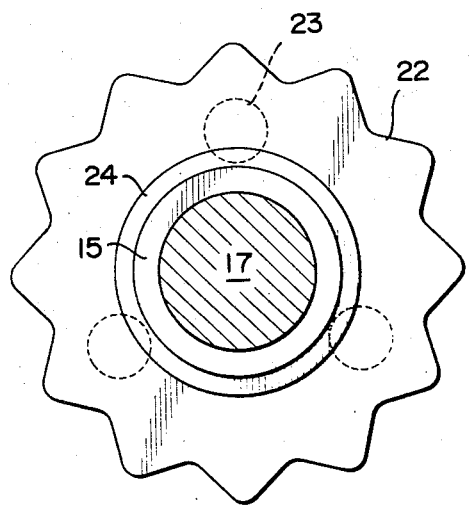
FIG. 3 is a sectional view taken along the line III—III in FIG. 1.

The nut 6b is connected to the frame 19b of the brake shoe 3 through a brake clearance adjusting mechanism M as will be described hereinafter. The screw rod 5 is provided at its right end with an outwardly opening axial bore 10 which receives the stub shaft 11a of a primary element 11 of one-way clutch device. The primary clutch element 11 is urged outwardly by a coil spring 12 which acts between the element 11 and a spring seat 13 which is seated at its pointed end on the conical bottom of the bore 10. As shown in FIG. 2, the bore 10 is formed with a pair of enlargements 10a at the diametrically opposed positions. The stub shaft portion 11a of the clutch element 11 is provided with a key plate 14 secured thereto by a pin 14 and the diametrically opposite sides of the key plate 14 are respectively received in the enlarged portions 10a. Thus, when the screw rod 5 is rotated by an angular distance exceeding the angular extent of the enlarged portions 10a, the rotation is transmitted to the clutch element 11 at the final stage of the rotation of the screw rod 5.

Figure 4:
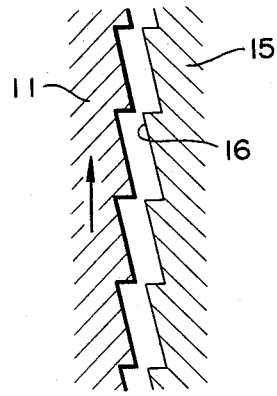
FIG. 4 is a fragmentary view showing the saw teeth on clutch elements.

At the right side of the primary clutch element 11, there is disposed a secondary clutch element or auxiliary nut 15 which has saw teeth 16 provided at the left hand side surface thereof as shown in FIG. 4 and is rotatably supported on the nut 6b. The saw teeth 16 on the secondary clutch element 15 is disposed in opposed relation with respect to the complementary saw teeth provided on the primary element 11. The secondary element 15 has an internally threaded axial bore in which an externally threaded portion of a push rod 17 is received. The push rod 17 has a bifurcated end with a convex bottom 18b for engagement with the frame 19b of the brake shoe 3. The secondary element or auxiliary nut 15 is also provided with a boss portion of a reduced outer diameter on which a manually actuated gear 22 is rotatably supported. The gear 22 is provided, at the side facing the radially directed annular surface formed between the outer periphery and the boss portion of the secondary element 15, with a plurality of conical recess 23. A corresponding number of pins 21 are axially slidably disposed through the secondary element 15 and have at one of their ends head portions 21a which are respectively received by the conical recess 23 in the gear 22. The pins 21 abut the primary element 11 at the adjacent ends. Thus, when the gear 22 is manually rotated, the pins 21 are caused to move leftwardly pushing the primray clutch element 11 from the engagement with the secondary clutch element 15. A further rotation of the gear 22 produces the rotation of the secondary clutch element 15. The gear 22 is axially held by an annular clip 24 on the boss of the auxiliary nut 15.

In explaining the operation of the aforementioned brake device, it is assumed that the brake drum 1 is rotating in the direction shown by an arrow in FIG. 1. When the link member 9 is axially moved, the arm 7 is caused to swing and thus the screw rod 5 is rotated. Thus, the nuts 6a and 6b are caused to move from each other, so that the brake shoes 3 are forced toward the inner surface of the brake drum 1. Since the screw rod 5 is of a floating type and since the brake drum 1 is rotating in the direction shown by the arrow in FIG. 1, the reaction of braking effort forces the nut 6a into engagement at its shoulder portion Ta with the screw housing 2. Thus, the braking reaction is transmitted from the brake shoe 3 through the frame 19a and the nut 6a to the screw housing 2. As far as the brake device has a normal brake clearance between the inner surface of the brake drum 11 and each of the brake linings 4, the angle of rotation of the screw rod 5 does not exceed the angular extent of the enlarged portions 10a of the bore 10.

When the brake linings 4 are worn and the brake clearance is increased, the rotation of the screw rod 5 causes the rotation of the primary clutch element 11 after a predetermined amount of lost motion movement. Thus, the primary clutch element 11 is moved with respect to the secondary element 15 in the direction shown by an arrow in FIG. 4. In this instance, due to the formation of the saw teeth, the rotation of the primary element is not transmitted to the secondary element 15. As the brake is released, the screw rod 5 is rotated in the opposite direction retracting the nuts 6a and 6b toward each other. Then, primary clutch element 11 is also rotated in the direction opposite to the arrow in FIG. 4 at the final stage of the returning rotation of the screw rod 5. Thus, the auxiliary nut 15 is also rotated through the mutually engaging saw teeth on the primary and secondary clutch elements 11 and 15. Since the push rod 17 is restricted against rotation due to the engagement with the frame 19b of the brake shoe 3, the rotation of the auxiliary nut 15 causes an axially outward movement of the push rod 17. Thus, the brake clearance between the brake linings 4 and the inner surface of the brake drum 1 can automatically be adjusted to a normal value.

This arrangement is particularly advantageous in that the adjustment is performed when the braking force is released so that a positive adjustment can be attained.

The arrangement also enables a manual brake clearance adjustment. For this purpose, the gear 22 is rotated in one or other direction. This rotation of the gear 22 initially causes the disengagement of the primary clutch element 11 from the secondary clutch element 15 and then rotates the secondary element 15. Thus, the push rod 17 is axially extended or retracted as desired.

Figure 5:
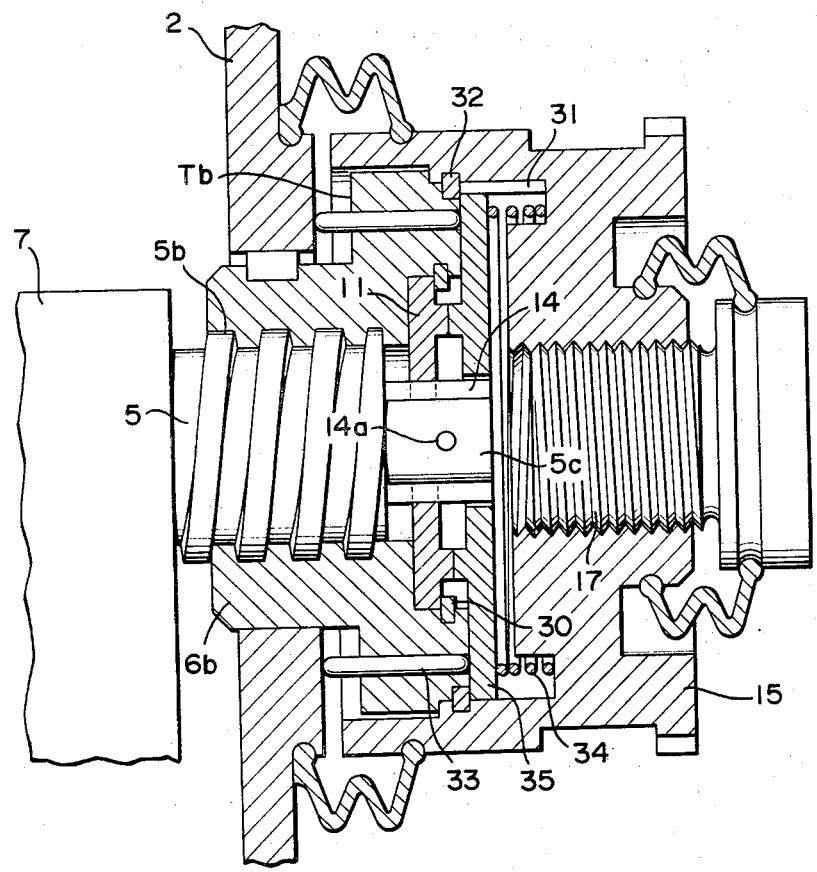
FIG. 5 is a fragmentary sectional view of another embodiment of the present invention.

In the above arrangement, the brake clearance adjusting mechanism M is effective in both of the forward and reverse movements of the automobile. In the arrangement shown in FIG. 5, the clearance adjusting mechanism is effective only in the forward movement of the automobile. In FIG. 5, corresponding parts are shown by the same reference numerals as in FIGS. 1 through 4. In this arrangement, the screw rod 5 is provided with a projection 5c at its right end which has a key plate 14 secured thereto by a pin 14a. A primary clutch element 11 is rotatably received in the counterbore formed in the nut 6b and retained therein by C-clip 30. The projection 5c of the screw rod 5 is connected through the key plate 14 to the primary clutch element 11 just the same as in the previous embodiment. A secondary clutch element 35 is axially slidably received in the auxiliary nut 15 through a key 31 and axially retained by a C-clip 32. The secondary element 35 is biased leftwardly by a spring 34 into engagement with the primary clutch element 11. The auxiliary nut 15 has a push rod 17 which threadably engages therewith as in the previous embodiment.

The operation of the device shown in FIG. 5 is the same as in the previous embodiment during the forward movement of the automobile. During the reverse movement, it should be noted from FIG. 1 that the brake drum 1 is rotating in the direction opposite to the arrow and the shoulder portion Tb of the nut 6b is brought into engagement with the screw housing 2. Thus, in the arrangement of FIG. 5, when the brake is applied during reverse movement of the automobile, the nut 6b is moved toward left in the drawing until the shoulder portion Tb abuts the screw housing 2. Then, a plurality of push rods 33 axially passing through the nuts 6b and engaging at their opposite ends with the screw housing 2 and the secondary clutch element 35 serve to retain the secondary clutch element against leftward movement, while the nut 6b and the primary clutch element 11 are moved toward left under the influence of brake reaction force. Thus, the clutch elements 11 and 15 are disengaged from each other and the brake clearance adjustment is made ineffective. In this arrangement, manual adjustment can readily be achieved by simply rotating the auxiliary nut 15 because the clutch elements 11 and 35 are disengaged from each other when the brake is released.

It is preferred that the brake clearance adjusting mechanism M is positioned at the trailing side as shown in FIG. 1 because when it is positioned in the leading side effective adjustment may not possibly be attained since the shoe 3 must be pushed back against the thrust force transmitted from the brake drum 1.

The arrangement of the present invention is advantageous in that all of the teeth on the clutch elements 11 and 15 are in engagement when the adjustment is made so that a positive adjustment can be performed and a manual adjustment can be made without providing any additional switching mechanism.

The present invention has been shown and described with reference to particular structures which are believed to be preferred ones, but it should be noted that the invention is in no way limited to the structural details of the illustrated embodiments and that many changes and modifications can be made without departing from the scope of the appended claims.

I claim:

1. A brake device comprising a brake drum, a pair of brake shoes having brake linings adapted to be brought into friction contact with the brake drum, a floating screw rod having screw threads of opposite directions at its opposite ends, means for rotating said screw rod, a pair of nuts supported axially movably on a stationary part and threadably engaging with the screw threads at the ends of the screw rod, said nuts being adapted to be axially moved in response to the rotation of the screw rod for pushing the brake shoes into friction contact with the brake drum, characterized by the fact that at least one of the nuts is connected through a brake clearance adjusting mechanism comprising a one way clutch means including a primary clutch element connected to the screw rod through a lost motion mechanism so that the element is rotated when the screw rod is rotated during brake application beyond a predetermined angular extent and a secondary clutch element which is rotated by the primary clutch element during returning movement of the latter after it is rotated by the screw rod, and means for moving one of the brake shoes with respect to the brake drum in response to the rotation of the secondary clutch element.

2. A brake device in accordance with claim 1 in which said secondary clutch element is provided with an internal thread, a push rod being provided and having an external thread for engagement with the internal thread of the secondary clutch element, said push rod being connected with said one brake shoe and restricted againsted rotation, whereby a rotation of the secondary clutch element is transferred into an axial movement of the push rod for producing an adjusting movement of the brake shoe with respect to the brake drum.

3. A brake device in accordance with claim 2 which further comprises means for manually disengaging the clutch elements and thereafter rotating said secondary clutch element.

4. A brake device in accordance with claim 3 in which said means comprises a manually rotatable member supported on the secondary clutch element, at least one pin member extending through the secondary clutch element between the primary clutch element and the manually rotatable member, and means for transferring the rotating movement of the manually rotatable member into an axial movement of the pin member, whereby the rotation of the manually rotatable member initially disengages the clutch elements and then rotates the secondary clutch element.

5. A brake device in accordance with claim 4 in which said pin member is in engagement with the manually rotatable member at a conical recess formed in the latter.

6. A brake device in accordance with claim 1 which further comprises means for disengaging the clutch elements during braking operation for the rotation of the brake drum in one direction so that the brake clearance adjusting mechanism is made inoperative for the rotation of the brake drum in said direction.

7. A brake device in accordance with claim 1 in which said nuts are supported axially movably but not rotatably on a stationary housing, at least one push rod being provided through the nut combined with the brake clearance adjusting mechanism and extending between the secondary clutch element and the stationary housing whereby, when the nut is displaced toward the housing, the primary clutch element is moved apart from the secondary clutch element while it is restricted from the movement toward the stationary housing.

8. A brake device in accordance with claim 7 which further comprises an internally threaded member rotatable with said secondary clutch member, and a non-rotatable push rod threadably engaging with said internally threaded member and connected with the adjacent brake shoe.

9. A brake device in accordance with claim 8 in which said internally threaded member is manually rotatable.

* * * * *